US009378236B2

(12) United States Patent
Ramaswamy et al.

(10) Patent No.: US 9,378,236 B2
(45) Date of Patent: Jun. 28, 2016

(54) IN-PLACE RECIPIENT PRESERVATION

(71) Applicant: Microsoft Corporation, Redmond, WA (US)

(72) Inventors: Sanjay Ramaswamy, Redmond, WA (US); Julian Zbogar-Smith, Redmond, WA (US); Zainal Arifin, Redmond, WA (US); Thottam R. Sriram, Redmond, WA (US); Hardik Solanki, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 195 days.

(21) Appl. No.: 14/141,084

(22) Filed: Dec. 26, 2013

(65) Prior Publication Data
US 2015/0186440 A1 Jul. 2, 2015

(51) Int. Cl.
G06F 7/00 (2006.01)
G06F 17/00 (2006.01)
G06F 17/30 (2006.01)
H04L 12/58 (2006.01)
G06Q 10/10 (2012.01)

(52) U.S. Cl.
CPC .... G06F 17/30336 (2013.01); G06F 17/30073 (2013.01); G06Q 10/107 (2013.01); H04L 51/22 (2013.01)

(58) Field of Classification Search
None
See application file for complete search history.

(56) References Cited

U.S. PATENT DOCUMENTS

| 2005/0188045 | A1* | 8/2005 | Katsikas | G06Q 10/107 709/206 |
| 2006/0075051 | A1 | 4/2006 | Jain et al. | |
| 2006/0123087 | A1 | 6/2006 | Gibson | |
| 2006/0168068 | A1* | 7/2006 | Ziegert | G06Q 10/107 709/206 |
| 2006/0224750 | A1* | 10/2006 | Davies | H04L 12/587 709/229 |
| 2007/0124398 | A1* | 5/2007 | Parkinson | G06Q 10/10 709/206 |
| 2009/0313342 | A1* | 12/2009 | Thie | G06Q 10/00 709/206 |
| 2010/0017607 | A1* | 1/2010 | Shkolnikov | H04L 51/28 713/168 |
| 2011/0225254 | A1* | 9/2011 | Atkins | G06Q 10/107 709/206 |
| 2013/0080342 | A1* | 3/2013 | Talati | G06Q 50/18 705/311 |

OTHER PUBLICATIONS

Buckles, Greg, "Handling BCC Recipients in eDiscovery", Published on: Feb. 28, 2011, Available at: http://ediscoveryjournal.com/2011/02/handling-bcc-recipients-in-ediscovery/.
Clagg, Steve, "Intereception and Redirection of Messages Using Transport Rules of Journaling", Published on: Jan. 28, 2010, Available at: http://blogs.technet.com/b/exchange/archive/2010/01/28/3409250.aspx.
"Using Mail Journaling to Determine Intended Message Recipients", Retrieved on: Nov. 13, 2013, Available at: http://publib.boulder.ibm.com/infocenter/domhelp/v8r0/index.jsp?topic=%2Fcom.ibm.help.domino.admin.doc%2FDOC%2FH_USING_MAIL_JOURNALING_TO_DETERMINE_INTENDED_MESSAGE_RECIPIENTS_STEPS.html.
"International Search Report and Written Opinion Issued in PCT Application No. PCT/US2014/069641", Mailed Date: Jan. 12, 2016, 7 Pages.

* cited by examiner

Primary Examiner — Tuan A Pham
(74) Attorney, Agent, or Firm — Damon Rieth; Jim Ross; Micky Minhas

(57) ABSTRACT

One or more indirect recipients of a communication item within a communication management application (CMA) may be preserved in-place. Indirect recipients include individual recipients within a distribution list (DL) via TO, carbon copy (CC), and/or blind carbon copy (BCC) fields of the communication item. At time of submission of the communication item, the CMA in conjunction with an assistant service may expand the DL to retrieve a list of individual recipients from the DL. The DL may be expanded by querying a directory server associated with the CMA. The DL expansion list may be saved to the communication item at the CMA by updating one or more properties of the communication item according to the expansion list. The DL expansion list may then be referenced for indexing so that a discovery search may be performed in-place at the CMA if and when the search is needed.

17 Claims, 8 Drawing Sheets

IN-PLACE RECIPIENT PRESERVATION

BACKGROUND

Globally, compliance and regulatory requirements may force companies to preserve and provide electronic information such as e-mail messages, documents, and other similar electronic information. Failure to provide such information may result in financial and/or legal exposure for the companies. In order to satisfy organizational, compliance or legal rules, legal and/or compliance officers within the companies may often rely on discovery searches to retrieve relevant content. Key to retrieval of the relevant content is the ability to identify participants who may have been involved in any pertinent communications in a timely, comprehensive, and accurate manner. Ease of use is important too, as the legal and/or compliance officers are not expected to be technical or product experts.

While current communication management applications (CMAs) may offer an ability to identify direct recipients in communications, such as individual recipients via TO, carbon copy (CC), and/or blind carbon copy (BCC) fields, the CMAs do not offer an ability to identify non-direct recipients, such as one or more recipients within a distribution list (DL). As a result, companies may often rely on journaling with third-party archiving solutions to store and index the communications, so that they may be later retrieved for discovery searches. The third-party archiving solutions may include an external, single-instance storage system that stores journal-based reports for every communication. In addition to the content of the communication itself, the reports may also contain all the intended recipients, both direct and indirect, on the communication.

SUMMARY

This summary is provided to introduce a selection of concepts in a simplified form that are further described below in the Detailed Description. This summary is not intended to exclusively identify key features or essential features of the claimed subject matter, nor is it intended as an aid in determining the scope of the claimed subject matter.

Embodiments are directed to in-place preservation of one or more indirect recipients of a communication item within a communication management application (CMA). Indirect recipients may include one or more individual recipients within a distribution list (DL) via TO, carbon copy (CC), and/or blind carbon copy (BCC) fields of the communication item. In some embodiments, the CMA in conjunction with an assistant service may expand the DL of a sent communication item at time of submission to retrieve a list of the individual recipients from the DL. The DL expansion list may be saved to the communication item within the CMA by updating one or more properties of the communication item according to the expansion list. In other embodiments, the DL expansion list may then be referenced for indexing so that a discovery search may be performed in-place at the CMA if and when the search is needed.

These and other features and advantages will be apparent from a reading of the following detailed description and a review of the associated drawings. It is to be understood that both the foregoing general description and the following detailed description are explanatory and do not restrict aspects as claimed.

DETAILED DESCRIPTION

Figure 1:
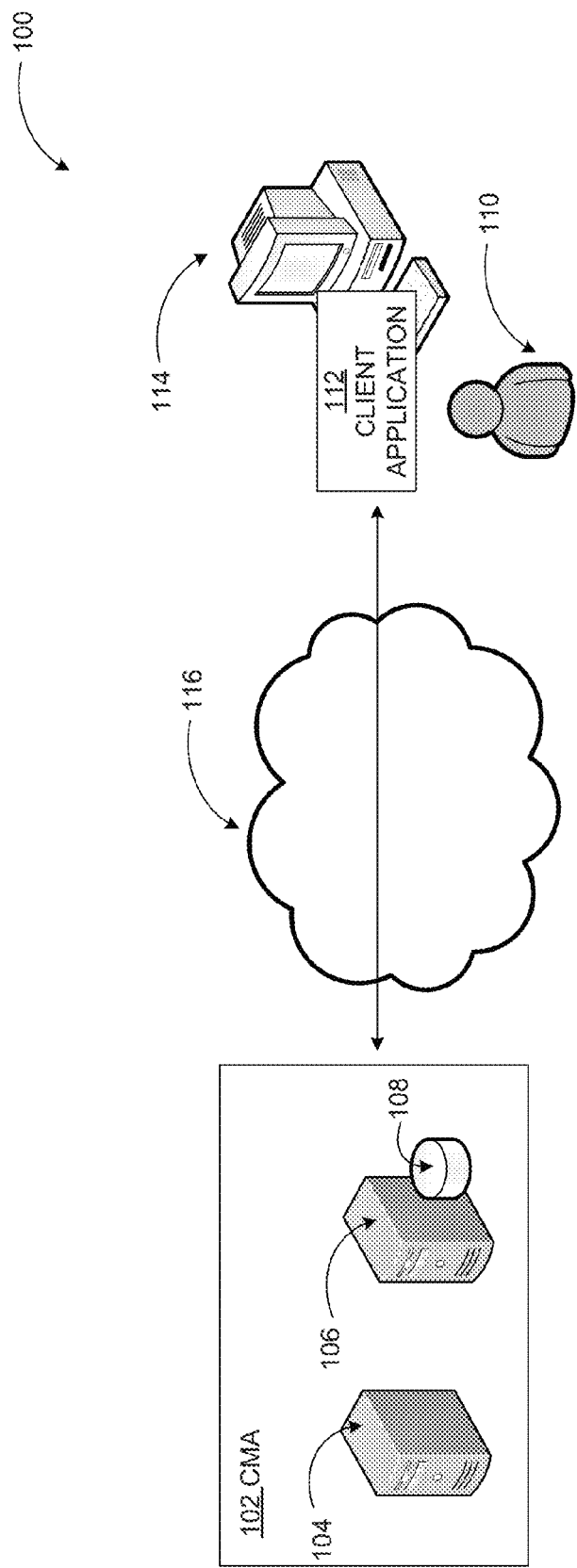
FIG. 1 includes a conceptual diagram illustrating an example networked configuration environment, where embodiments may be implemented.

As briefly described above, one or more indirect recipients of a communication item within a communication management application (CMA) may be preserved in-place. Indirect recipients may include one or more individual recipients within a distribution list (DL) via TO, carbon copy (CC), and/or blind carbon copy (BCC) fields of the communication item. At time of submission of the communication item, the CMA in conjunction with an assistant service may expand the DL to retrieve a list of individual recipients from the DL by querying a directory server associated with the CMA. The DL expansion list may be saved to the communication item at the CMA by updating one or more properties of the communication item according to the expansion list. The DL expansion list may then be referenced for indexing so that a discovery search may be performed in-place at the CMA if and when a search is needed.

In the following detailed description, references are made to the accompanying drawings that form a part hereof, and in which are shown by way of illustrations specific embodiments or examples. These aspects may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

While some embodiments will be described in the general context of program modules that execute in conjunction with an application program that runs on an operating system on a personal computer, those skilled in the art will recognize that aspects may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multiprocessor systems, microprocessor-based or programmable consumer electronics, minicomputers, mainframe computers, and comparable computing devices. Embodiments may also be practiced in distributed computing environments where tasks are performed by remote processing devices that are linked through a communications network. In a distributed computing environment, program modules may be located in both local and remote memory storage devices.

Some embodiments may be implemented as a computer-implemented process (method), a computing system, or as an article of manufacture, such as a computer program product or computer readable media. The computer program product may be a computer storage medium readable by a computer system and encoding a computer program that comprises instructions for causing a computer or computing system to perform example process(es). The computer-readable storage medium is a computer-readable memory device. The computer-readable storage medium can for example be implemented via one or more of a volatile computer memory, a non-volatile memory, a hard drive, a flash drive, a floppy disk, or a compact disk, and comparable hardware media.

Throughout this specification, the term "platform" may be a combination of software and hardware components for in-place preservation of one or more indirect recipients of a communication item within a CMA. Examples of platforms include, but are not limited to, a hosted service executed over a plurality of servers, an application executed on a single computing device, and comparable systems. The term "server" generally refers to a computing device executing one or more software programs typically in a networked environment. However, a server may also be implemented as a virtual server (software programs) executed on one or more computing devices viewed as a server on the network. More detail on these technologies and example operations is provided below.

FIG. 1 includes a conceptual diagram illustrating an example networked configuration environment, where embodiments may be implemented. A CMA 102 may be executed on one or more servers (104, 106). Examples of CMA may include email, text messaging, calendaring, and other communication applications that may facilitate exchange of messages, documents, audio/video communication, and other forms of data. The servers may include a communication management server 104 and/or a directory server 106. The directory server may include a database 108 that contains contact information, permissions, presence information, and comparable data of clients associated with the CMA 102.

A client application 112 may be communicatively coupled to the CMA 102 through an application programming interface (API) on a middle tier of the communication management server 104. To send and receive communication items, such as an e-mail message or document, a client 110 may interact with the client application 112. The client application 112 may be executed on one or more client devices 114, such as a desktop, a laptop, a tablet, a smart phone, or other similar device, via a cloud 116. In other embodiments, the client application 112 may be a browser-based extension of a hosted CMA such as a web application accessed through a browser on the client devices 114.

The client 110 may send an e-mail message, to one or more direct recipients and/or indirect recipients through the CMA 102. As described herein, a direct recipient may be a recipient whose display name and/or individual email address is selected by the client 110 via TO, carbon copy (CC), and/or blind carbon copy (BCC) fields of the communication item. An indirect recipient may be a recipient who is selected by the client 110 using a distribution list (DL) via TO, carbon copy (CC), and/or blind carbon copy (BCC) fields of the communication item.

A DL may include distribution groups, mail-enabled security groups and/or dynamic distribution groups. The distribution groups, including the dynamic distribution groups, may be comprised of one or more e-mail addresses for one or more indirect recipients, respectively, where the e-mail addresses are tied to one specific e-mail address. For example, the one or more recipients within a distribution group may be one or more members associated with a team project. Therefore, the client 110 may efficiently select the distribution group instead of each individual member's email addresses when sending an e-mail message collectively to the members associated with the team project. The mail-enabled security groups, while similar in communication functionality to the distribution groups, may also enable the client 110 to assign permissions to multiple people. For example, the client 110 may assign permissions to a folder to the members associated with the team project and instead of selecting each member individually, the client may create a group called Team Project, for example, and assign permissions to the group. As the group gains or loses members, the client 110 may efficiently add or subtract the members from the group through the CMA 102, and the changes may be made accordingly throughout the system.

The client application 112 may support a cached mode or a non-cached mode and enable users to select one or more save options for sent communication items. The save options may include to save a communication item to a Sent Items folder, to not save the communication item to any folder, or to save the communication item to a same non-Inbox folder when replying from the same folder. However, within each mode and each save option, the sent communication item may pass through a Transport pipeline upon submission of the communication item.

In an example scenario, a DL may include Members 1 and 2. The client 110 may send an email via the DL so both Members 1 and 2 receive the email. Later, a legal officer may perform a discovery search on the client's mailbox, looking for emails between the client 110 and Member 1. Using current CMA platforms, the search "TO: Member 1" may only return e-mails sent directly to Member 1. Any e-mail sent to Member 1 via the DL may not be returned.

Contrastingly, within the Transport pipeline one or more indirect recipients via a DL of the communication item may be preserved in-place within the CMA 102 according to some embodiments. By expanding the DL at time of submission of the communication item, an expansion list including the one or more indirect recipients, such as Members 1 and 2, may be retrieved and saved to the communication item within a mailbox of the client 110 within the CMA 102. Once saved to the communication item, a content index of a search service may index the recipients by a display name and/or one or more e-mail attributes, so the search service may later be utilized within the mailbox of the sender. As a result, the search "TO: Member 1" may now return emails received by Member 1 from the client 110 either directly or indirectly through the DL. The Transport pipeline and DL expansion may be described in full detail in FIGS. 2 and 3A-B below.

The example systems in FIG. 1 have been described with specific servers, client devices, applications, and interactions. Embodiments are not limited to systems according to these example configurations. In-place CMA preservation of one or more recipients of a communication item may be implemented in configurations employing fewer or additional components and performing other tasks. Furthermore, specific protocols and/or interfaces may be implemented in a similar manner using the principles described herein.

Figure 2:
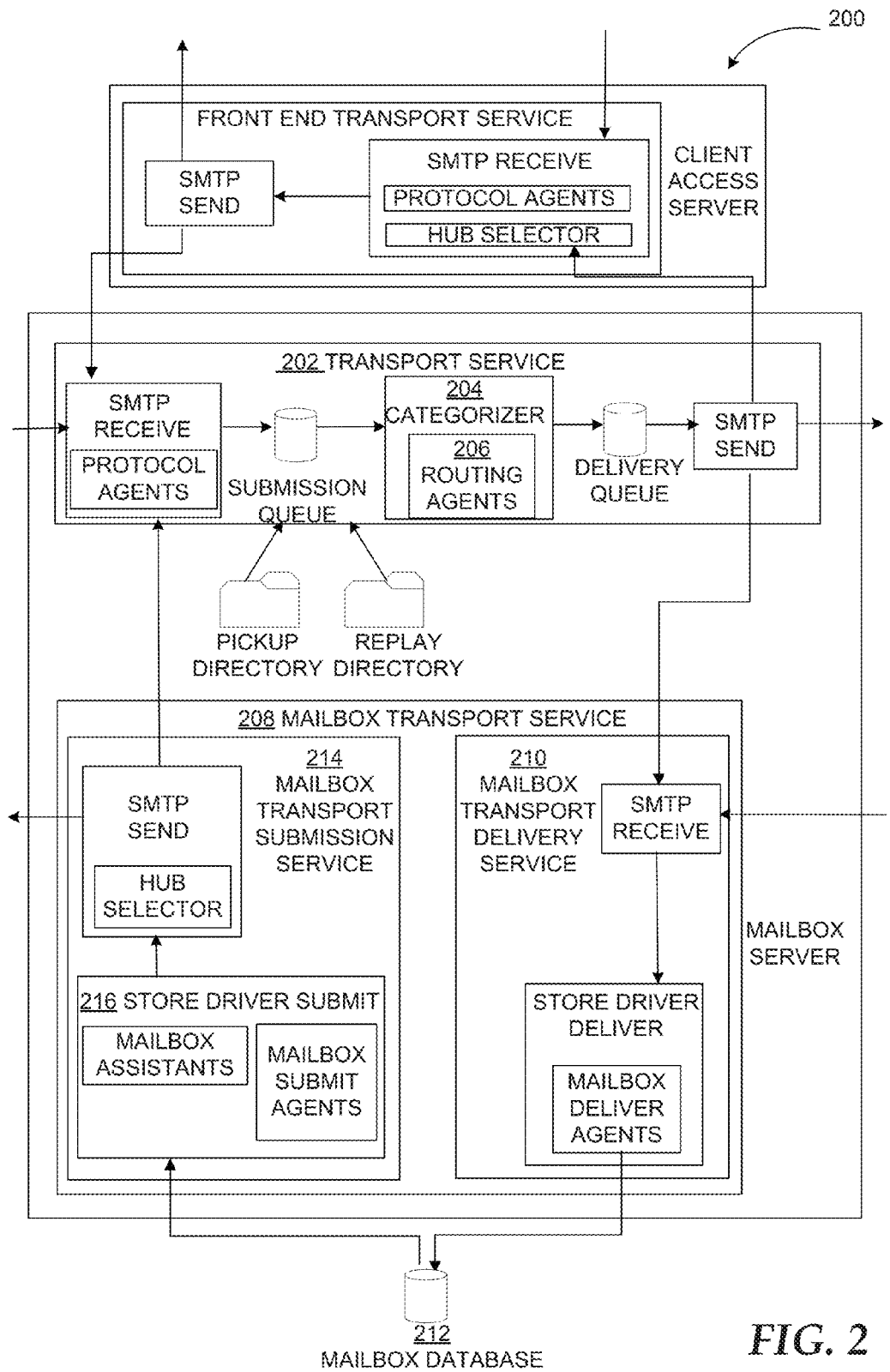
FIG. 2 illustrates an example Transport pipeline within a communication management application (CMA) which may be employed to preserve one or more indirect recipients of a communication item.

FIG. 2 illustrates one or more example approaches to preserve one or more indirect recipients of a communication item within a CMA. As discussed above in conjunction with FIG. 1, a client may interact with a client application coupled to a CMA or the client may interact directly with the CMA to send and receive communication items. In both embodiments, the sent communication items may pass through a Transport pipeline 200 within the CMA upon submission. For a communication item, such as an e-mail message, sent to indirect recipients via a DL, the CMA may already be configured to expand the DL to retrieve a list of recipients in order to know whom the message may be delivered to in a first DL expansion process. The first DL expansion process may occur in a Categorizer component 204 in Transport Service 202.

In order to preserve the indirect recipients of a communication item within the CMA, the DL may be expanded during submission of the communication item to retrieve an expansion list comprised of individual recipients of the DL. The expansion list may be stored at the communication item within the CMA by updating one or more properties of the communication item according to the expansion list. The expansion list may then be referenced when a content index of a search service may index the recipients within the expansion list to enable a discovery search to be later performed at a mailbox of a sender within the CMA. Several approaches to achieve preservation of indirect recipients within the CMA via DL expansion are discussed below.

In a first approach to preserve the indirect recipients of a communication item within a CMA, another Transport Agent may be written, and an event (e.g., an event on resolved message) may be subscribed to. The Transport Agent may be a subclass from Routing Agents 206. As a result, by the time an event handler is called by the Transport pipeline 200, a list of communication item recipients, including the recipients being expanded from the DL during the first DL expansion process, may be retrieved preventing a need for a second DL expansion process. However, the expansion list of recipients must be persevered at the communication item in an in-place storage system of the CMA, so that when a mailbox is indexed, the recipients in the list may be indexed correctly. Unfortunately, the list of communication recipients cannot be preserved in the Categorizer component 204 where the first DL expansion process occurs. Instead, the list of communication recipients may be preserved in a Mailbox Transport Delivery service component 210 which has access to the in-place storage system of the CMA in a mailbox database 212. However, to pass the expansion list information from the Categorizer component 204 to a Mailbox Transport Service 208, where the Mailbox Transport Delivery service component 210 is located, the expansion list information is delivered through message headers. While the second DL expansion process may not be needed, saving resources, the message headers needed to pass the expansion list information have a default size limit (for example, 64 KB), and already used for other purposes. Furthermore, since the DL expansion list is stored during delivery time, each e-mail message whose recipients contain a DL may be bloated in each recipient's mailbox. Therefore, this approach may fail to successfully expand the DL in a sender's mailbox during submission time.

In a variation of the first approach, instead of passing the expansion list to message headers in the newly written transport agent, a new transient message may be created with a body containing the expansion list. This approach may be similar to a journal report, but with a destination of the sender's mailbox. A new delivery agent may also be needed to process the transient message. The delivery agent may read the body of the transient message to retrieve the expansion list, find the original sent message, update the original sent message's property with the expansion list, and then cancel the delivery of the transient message. In this approach, the DL expansion may be cost-effective and in-sync with the DL expansion logic in the Transport pipeline 200. Furthermore, the behavior may be similar to journaling style already widely used by clients. However, the Transport pipeline 200 may not be stable enough to accept more load from the transient messages, which may not be controlled once inserted.

In a second approach to preserve the indirect recipients of a communication item within a CMA, a second DL expansion may occur in a Mailbox Transport Submission Service 214 following the first DL expansion in the Categorizer component 204 within the Transport pipeline 200. The Mailbox Transport Submission Service 214 may retrieve the communication item to be sent from the mailbox database 212. A Store Driver Submit component 216 within the Mailbox Transport Submission Service 214 may then submit the communication item in the Transport pipeline 200 to be processed further and delivered to recipient mailboxes. Upon successful submission the Store Driver Submit component 216 may make a call (e.g., a call indicating done with message), which moves the e-mail message item from an Outbox folder to a Sent Items folder in the CMA and/or client application. A variation in the second approach is to expand the DL in the communication item after the move from the Outbox folder to the Sent Items folder, and save the expansion lists in the mailbox database 212. While the second approach performs the second DL expansion within a sender's mailbox, preventing bloating of the recipient's mailbox, and the expansion does not enter the Transport pipeline, preventing the message header size limit issue, the second DL expansion may be an expensive operation. Furthermore, performing the second DL expansion in the Mailbox Transport Submission Service 214 may slow down submission time, which may potentially increase a number of on-call escalations.

In a third approach to preserve the indirect recipients of a communication item within a CMA, a separate assistant service may operate in conjunction with the CMA. The communication item may be marked for a second DL expansion by the CMA if a sender of the communication item is on hold and the communication item contains at least one DL in recipients by flagging the item with an extended event flag. The communication item may then be stored as an extended event within the assistant service, where the extended event is filtered by one or more DL expansion event-based assistants (EBAs) within the assistant to isolate the communication item for expansion. The assistant service may then perform the second DL expansion on the communication item by querying from a directory server associated with the CMA and save the expansion list to one or more properties of the communication item within a mailbox of a sender within the CMA. In the third approach, the second DL expansion may be performed on the sender's mailbox, preventing bloating of the recipient's mailbox, and the expansion does not happen in Transport pipeline or during email submission, preventing above-mentioned issues. While the DL expansion may happen twice, the second expansion may occur if there are DLs in the communication item and the user is on hold preventing waste of resources. Furthermore, while the second DL expansion may not be in-sync with the DL expansion logic in Transport pipeline, since the assistant service is querying a directory server code which is not aware of the restriction, the assistant service may still expand and index all recipients within the DLs.

Comparing the three approaches, and their respective variations, the third approach presents the best option for in-place preservation of indirect recipients within the CMA. More details regarding the third approach may be discussed in FIGS. 3A and 3B below.

Figure 3A:
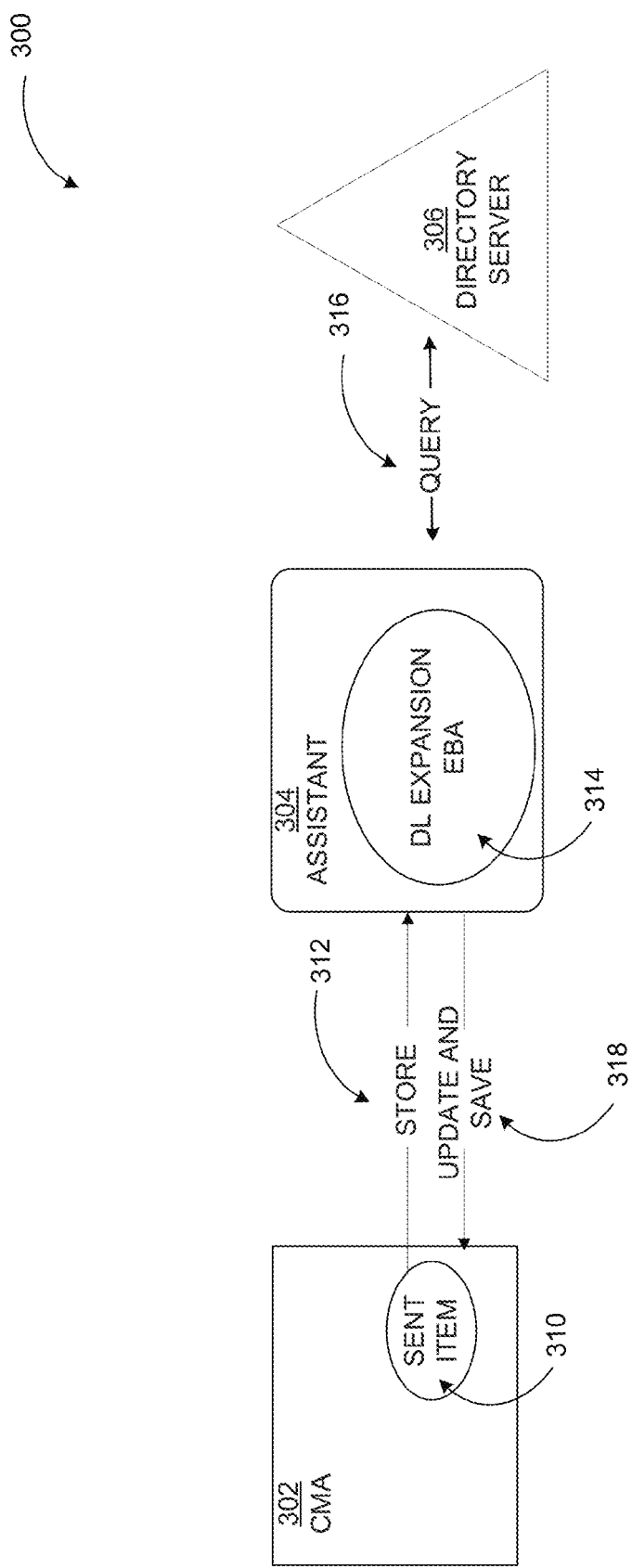
FIGS. 3A and 3B illustrate an example approach to preserve one or more indirect recipients of a communication item within a CMA in conjunction with an assistant service.
Figure 3B:
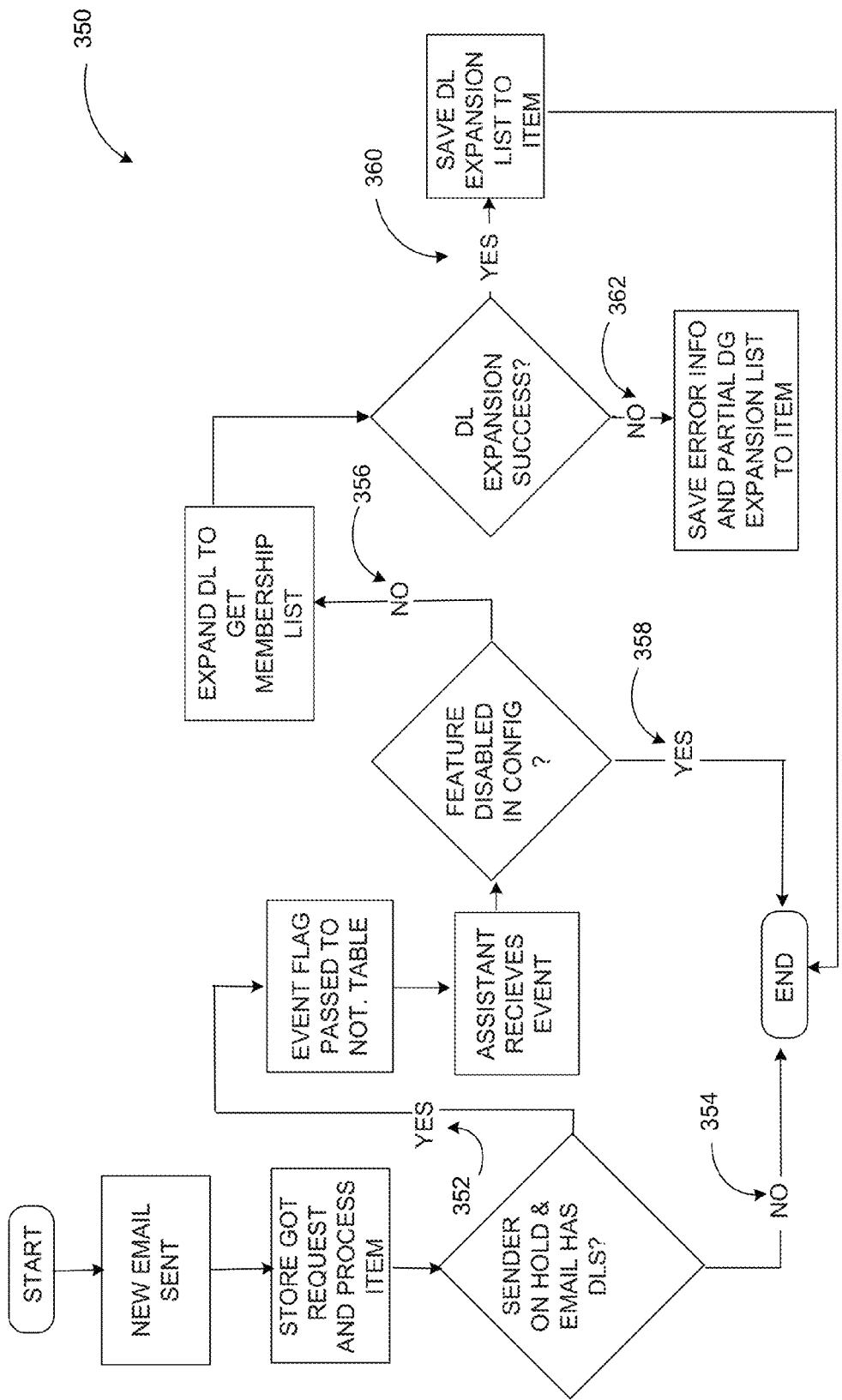

FIGS. 3A and 3B illustrate an example approach to preserve one or more indirect recipients of a communication item within a CMA in conjunction with an assistant service. As briefly discussed in FIG. 2, a separate assistant service 304 may operate in conjunction with a CMA 302 to preserve the indirect recipients of a communication item 310 within the CMA 302. Once a communication item has been sent, the CMA may process the communication item 310. In response to a determination by the CMA 302 that a sender of the communication item 310 is on hold and the communication item 310 contains one or more DLs, a special event flag may be passed to a notification table marking the communication item 310 as an extended event for DL expansion (e.g., operation 352). In some embodiments, a property, such as a property indicating a need for group expansion, of the communication item 310 may indicate that the sender of the communication item 310 is on hold and the communication item 310 contains one or more DLs. The communication item 310 may then be stored 312 at the assistant service 304 as an extended event for DL expansion. In response to a determination by the CMA 302 that a sender of the communication item 310 is not on hold and/or the communication item 310 does not contain one or more DLs, no further events are taken towards DL expansion (e.g., operation 354).

Within the assistant service 304, one or more DL expansion EBAs 314 may be configured to receive the extended event by filtering through a multitude of events at the assistant service to isolate the communication item prior to expansion. The DL expansion EBAs 314 may be interested in communication items with the extended event flags indicating the communication items are marked for DL expansion, such as the communication item 310. If the DL expansion feature is not disabled within a configuration of the communication item, the assistant service 304 may expand each DL in the communication item recipients to retrieve an expansion list (e.g., operation 356). The assistant service 304 may expand the DL by querying 316 from a directory server 306 of the CMA using existing directory server code. The code may expand the DL and its children (e.g., nested DL), until all of the leaf recipients have been visited or being instructed to stop the expansion. For example, the directory server may be instructed to stop expansion once a limit for total number of recipients and/or a total number of nested DLs has been reached. If the DL expansion feature in the configuration of the communication item is disabled, no further events are taken towards DL expansion (e.g., operation 358).

If the DL expansion is successful, the expansion list retrieved may be saved 318 to the communication item 310 within a mailbox of a sender by updating one or more properties of the communication item 310 according to the expansion list (e.g., operation 360). For example, a property indicating group expansion recipients may store the expansion list to the communication item within a mailbox of a sender of the communication item. The property indicating group expansion recipients may store information associated with recipients of DLs via TO, CC, and/or BC to allow simpler efficient compression and to lower input/output (I/O) since less properties may have to be loaded. The stored information associated with the recipients may include a display name and one or more e-mail attributes. If the DL expansion is not successful, error information may be written to an event log and a partial expansion list may be saved 318 to the communication item 310 in a property indicating group expansion error (e.g., operation 362).

Once the expansion list has been saved to the communication item, a content index of a search service may index the one or more recipients of the expansion list within the mailbox of the sender of the communication item. The recipients may be indexed by the display name and/or the e-mail attributes associated with the recipients to enable easy search if and when a discovery search is performed on the mailbox of the sender of the communication item.

Figure 4:
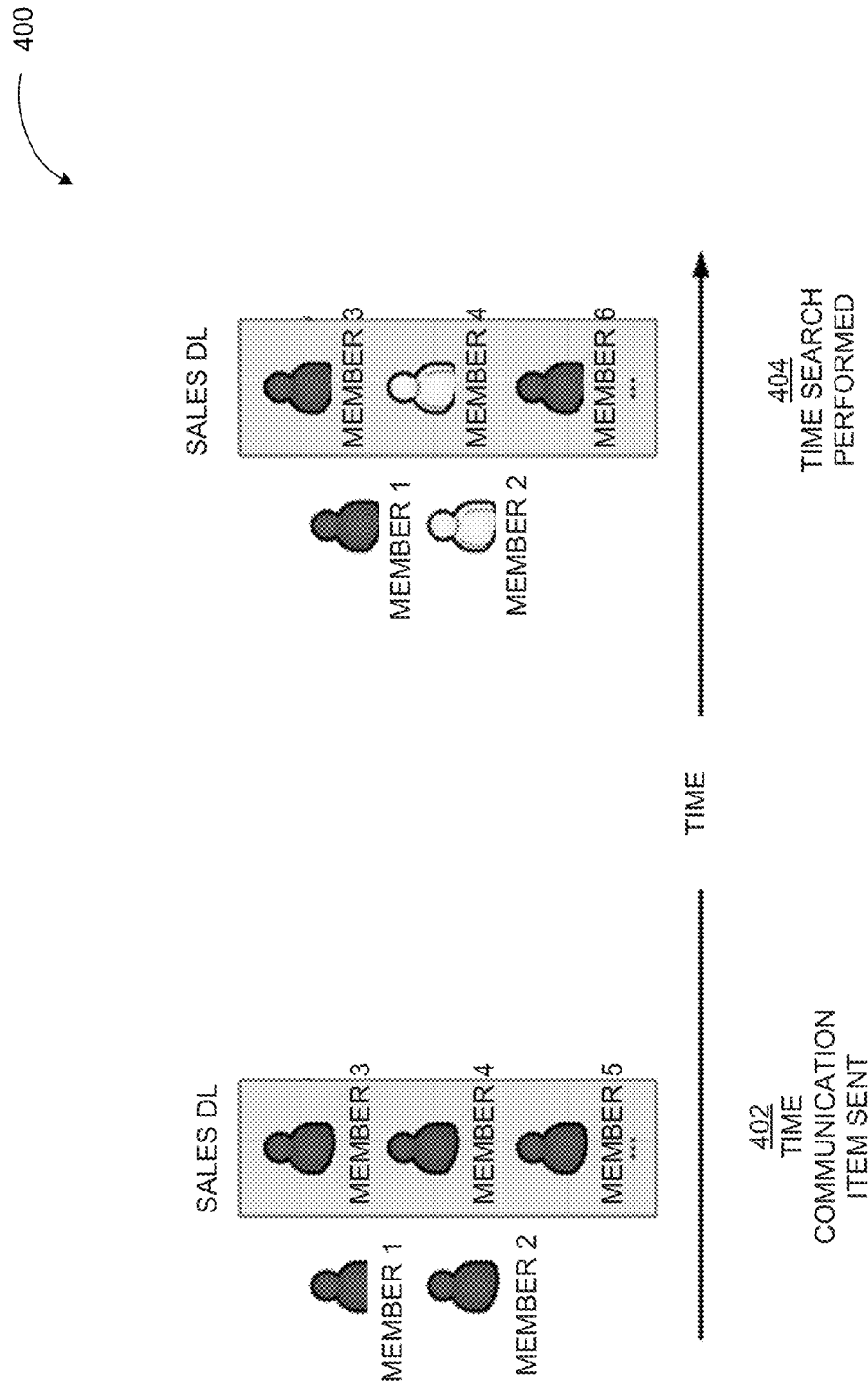
FIG. 4 illustrates an example scenario in which a method to preserve one or more indirect recipients of a communication item within a CMA may be implemented.

FIG. 4 illustrates an example scenario in which a method to preserve one or more indirect recipients of a communication item within a CMA may be implemented. In the example scenario, a legal team at a company may be investigating a possible intellectual property (IP) leak within the company. They have identified Member 1 as a potential employee whose communications involve investigation. At the time communication items involving investigation may have been sent 402, Members 2-5 may have been employees for the company. Per the organization's compliance requirements, Member 1's mailbox is on Hold. The legal team may first search in the mailbox of Member 1 for communication items sent by Member 1 to identify who all may have received communication items related to "Project X". In some cases, the legal team may find Sales DLs that may have been included in the TO and CC fields; in others, some Sales DLs may have been on the BCC field. Implementing the above-described embodiments, at the time the communication items related to "Project X" may have been sent 402 by Member 1, the CMA, in conjunction with an assistant service, expanded the DLs during submission time of the communication items by querying a directory server associated with the CMA. An expansion list, including each of the individual recipients within the DLs, such as Members 3,4, and 5 was retrieved, saved to the communication item within the mailbox of Member 1, and referenced to index the recipients enabling the legal team to perform a discovery search. As a result, the legal team may search for individual recipients using a display name and/or one or more e-mail attributes to return emails sent to the recipients directly or indirectly via the DL. To ensure that a full list of recipients has been acquired, the legal team may then search each recipient of the DL, such as Members 3, 4, and 5 to see if original communication items may have been further shared with other DLs and/or direct recipients.

The legal team may be relieved that they didn't have to go through additional searches or through information technology (IT) personnel, to come up with a comprehensive list of recipients who may have been on some DLs that may or may not exist anymore. For example, at the time the search was performed 404 by the legal team some of the recipients may no longer be employees of the company, such as Member 2 and 4, and some are external to the company. Also, at the time the search was performed 404 the members of the DL may have changed. For example, at the time the communication item was sent 402, the Sales DL comprised Members 3, 4 and 5. At the time the search was performed 404, the Sales DL is comprised of Members 3, 4, and 6. Implementing the above-described embodiment, the legal team may also be able to clearly identify Member 1's intent when critical communication items may have been sent to various parties, via BCC or a DL, as this information is clearly indicated in search results.

The examples in FIGS. 1 through 4 have been described with specific systems including specific approaches, applications, components, and component tasks. Embodiments are not limited to systems according to these example configurations. In-place CMA preservation of one or more indirect recipients of a communication item may be implemented in configurations using other types of systems including specific approaches, applications, components, and component tasks in a similar manner using the principles described herein.

Figure 5:
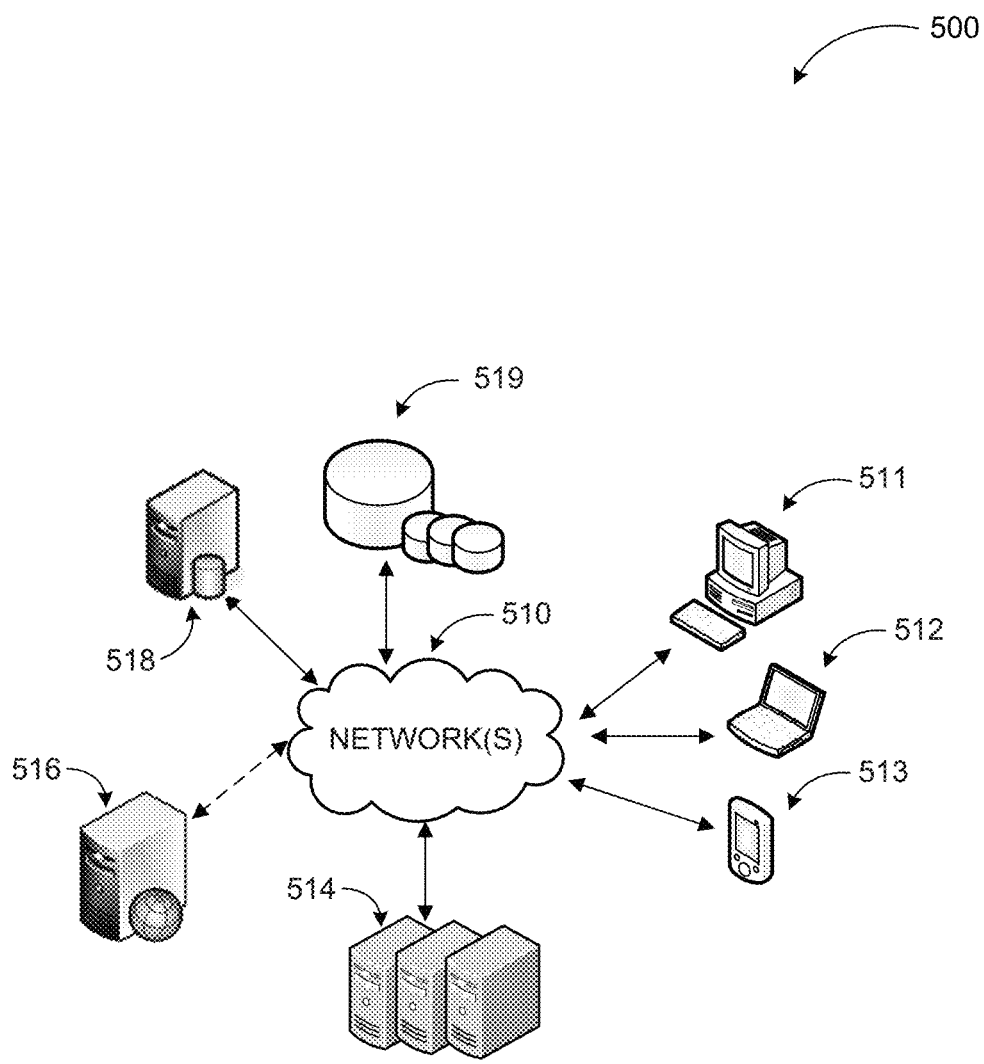
FIG. 5 is a networked environment, where a system according to embodiments may be implemented.

FIG. 5 is an example networked environment, where embodiments may be implemented. A system to preserve one or more indirect recipients within a CMA may be implemented via software executed over one or more servers 514 such as a hosted service. The platform may communicate with client applications on individual computing devices such as a smart phone 513, a laptop computer 512, or desktop computer 511 ('client devices') through network(s) 510.

Client applications executed on any of the client devices 511-513 may facilitate communications via application(s) executed by servers 514, or on individual server 516. A CMA application executed on one or more of the servers may be coupled to the client application and enable in-place preservation of indirect recipients of a communication item. The CMA, in conjunction with an assistant service, may be configured to perform a DL expansion during submission of the communication item in response to the item containing one or more DLs and a mailbox of a sender of the item being on hold. An expansion list including the indirect recipients of the DL may be retrieved during expansion and saved to the communication item within the CMA so it may be later referenced to index and search. The CMA may retrieve relevant data from data store(s) 519 directly or through database server 518, and provide requested services (e.g. document editing) to the user(s) through client devices 511-513.

Network(s) 510 may comprise any topology of servers, clients, Internet service providers, and communication media. A system according to embodiments may have a static or dynamic topology. Network(s) 510 may include secure networks such as an enterprise network, an unsecure network such as a wireless open network, or the Internet. Network(s) 510 may also coordinate communication over other networks such as Public Switched Telephone Network (PSTN) or cellular networks. Furthermore, network(s) 510 may include short range wireless networks such as Bluetooth or similar ones. Network(s) 510 provide communication between the nodes described herein. By way of example, and not limitation, network(s) 510 may include wireless media such as acoustic, RF, infrared and other wireless media.

Many other configurations of computing devices, applications, data sources, and data distribution systems may be employed to implement in-place preservation of one or more indirect recipients of a communication item within the CMA. Furthermore, the networked environments discussed in FIG. 5 are for illustration purposes only. Embodiments are not limited to the example applications, modules, or processes.

Figure 6:
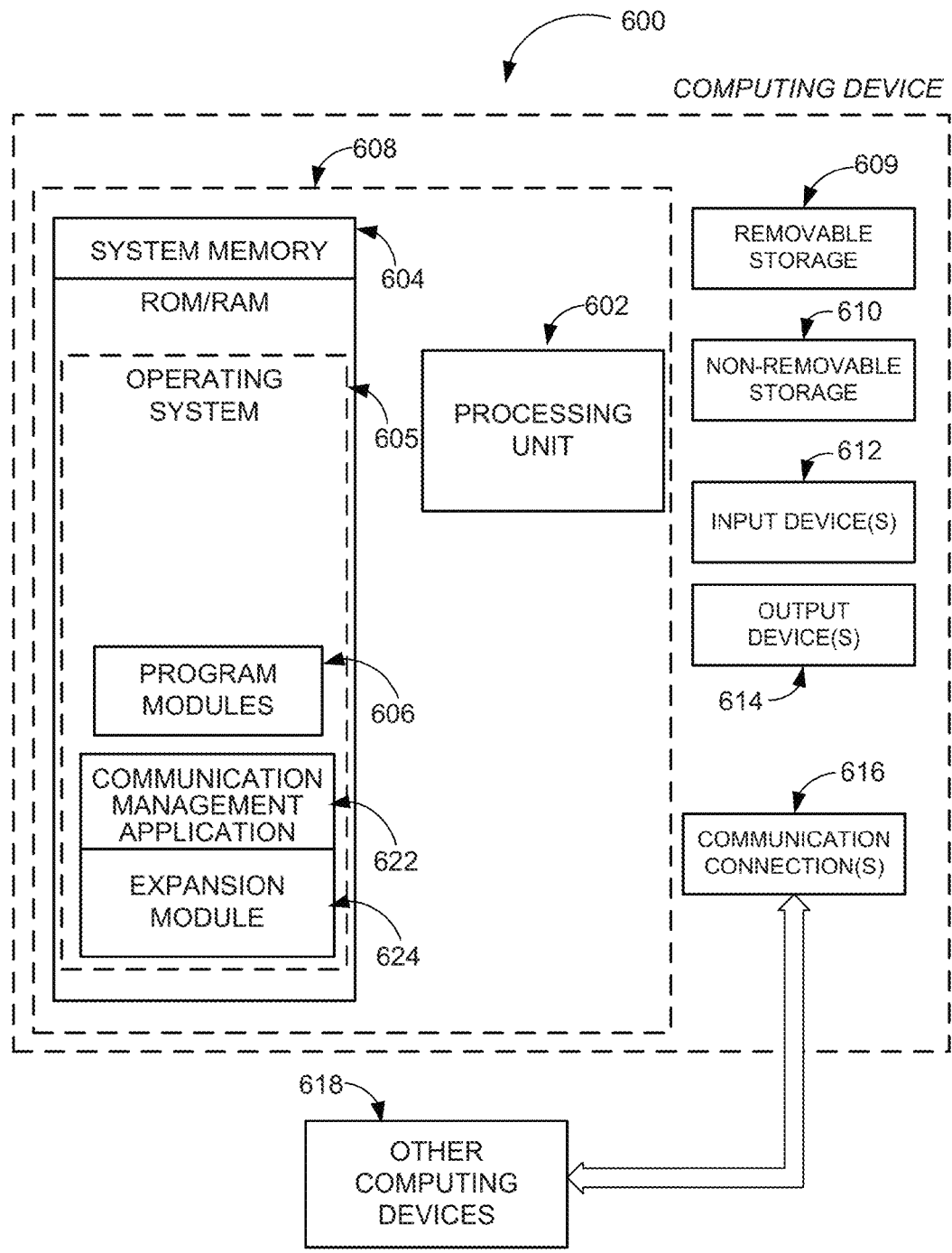
FIG. 6 is a block diagram of an example computing operating environment, where embodiments may be implemented.

FIG. 6 and the associated discussion are intended to provide a brief, general description of a suitable computing environment in which embodiments may be implemented. With reference to FIG. 6, a block diagram of an example computing operating environment for an application according to embodiments is illustrated, such as computing device 600. In a basic configuration, computing device 600 may be any portable computing device with wireless communication capabilities, which may include touch and/or gesture detection capability in some examples, and include at least one processing unit 602 and system memory 604. Computing device 600 may also include multiple processing units that cooperate in executing programs. Depending on the exact configuration and type of computing device, the system memory 604 may be volatile (such as RAM), non-volatile (such as ROM, flash memory, etc.) or some combination of the two. System memory 604 typically includes an operating system 606 suitable for controlling the operation of the platform, such as the WINDOWS®, WINDOWS MOBILE®, WINDOWS RT®, or WINDOWS PHONE® operating systems from MICROSOFT CORPORATION of Redmond, Wash. The system memory 604 may also include one or more software applications such as a CMA 622, and an expansion module 624.

The CMA 622, in conjunction with an assistant service, may perform a DL expansion during submission time of a communication item containing one or more DLs using the expansion module 624. Expansion of the DL may enable retrieval of an expansion list, including one or more individual recipients within the DL, which may be stored at the communication item within the CMA to be later referenced for indexing and searching. The CMA 622 and expansion module 624 may be separate applications or integrated modules of a hosted service. This basic configuration is illustrated in FIG. 6 by those components within dashed line 608.

Computing device 600 may have additional features or functionality. For example, the computing device 600 may also include additional data storage devices (removable and/or non-removable) such as, for example, magnetic disks, optical disks, or tape. Such additional storage is illustrated in FIG. 6 by removable storage 609 and non-removable storage 610. Computer readable storage media may include volatile and nonvolatile, removable and non-removable media implemented in any method or technology for storage of information, such as computer readable instructions, data structures, program modules, or other data. System memory 604, removable storage 609 and non-removable storage 610 are all examples of computer readable storage media. Computer readable storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 600. Any such computer readable storage media may be part of computing device 600. Computing device 600 may also have input device(s) 612 such as keyboard, mouse, pen, voice input device, touch input device, an optical capture device for detecting gestures, and comparable input devices. Output device(s) 614 such as a display, speakers, printer, and other types of output devices may also be included. These devices are well known in the art and need not be discussed at length here.

Some embodiments may be implemented in a computing device that includes a communication module, a memory device, and a processor, where the processor executes a method as described above or comparable ones in conjunction with instructions stored in the memory device. Other embodiments may be implemented as a computer readable memory device with instructions stored thereon for executing a method as described above or similar ones. Examples of memory devices as various implementations of hardware are discussed above.

Computing device 600 may also contain communication connections 616 that allow the device to communicate with other devices 618, such as over a wired or wireless network in a distributed computing environment, a satellite link, a cellular link, a short range network, and comparable mechanisms. Other devices 618 may include computer device(s) that execute communication applications, web servers, and comparable devices. Communication connection(s) 616 is one example of communication media. Communication media can include therein computer readable instructions, data structures, program modules, or other data. By way of example, and not limitation, communication media includes wired media such as a wired network or direct-wired connection, and wireless media such as acoustic, RF, infrared and other wireless media.

Example embodiments also include methods. These methods can be implemented in any number of ways, including the structures described in this document. One such way is by machine operations, of devices of the type described in this document.

Another optional way is for one or more of the individual operations of the methods to be performed in conjunction with one or more human operators performing some. These human operators need not be collocated with each other, but each can be only with a machine that performs a portion of the program.

Figure 7:
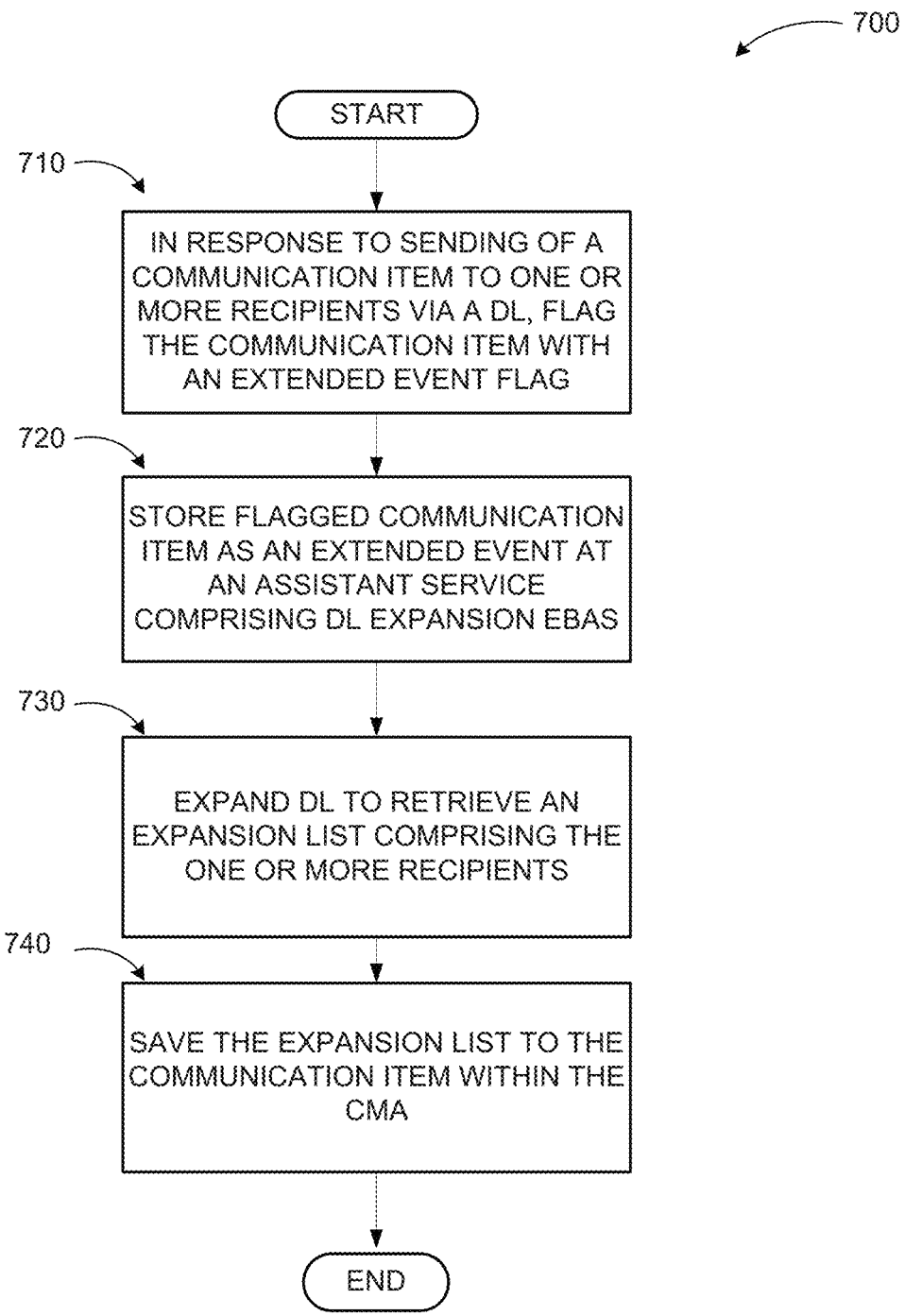
FIG. 7 illustrates a logic flow diagram of a method to preserve one or more indirect recipients of a communication item within a CMA, according to embodiments.

FIG. 7 illustrates a logic flow diagram for process 700 of a method to preserve one or more indirect recipients within a CMA according to embodiments according to embodiments. Process 700 may be implemented on a server or other system.

Process 700 begins with operation 710, where a communication item is flagged with an extended event flag by the CMA in response to the communication item being sent to one or more recipients via a DL and a mailbox of a sender of the communication being on hold. The extended event flag may mark the communication item for DL expansion. At operation 720, the flagged communication item may then be stored as an extended event at an assistant service. The assistant service may include one or more DL expansion EBAs that may be configured to filter through a multitude of events within the assistant service to isolate extended events marked for DL expansion.

At operation 730, the assistant service may query a directory server associated with the CMA to expand the DL to retrieve an expansion list including the one or more recipients of the communication item. The directory server may include contact information, permissions, and/or presence information associated with members of the CMA. As a result, the expansion list may include a display name and/or one or more e-mail attributes associated with the one or more recipients.

At operation 740, the expansion list may be saved to the communication item within a mailbox of the sender at the CMA by updating one or more properties of the communication item according to the expansion list. The saving of the expansion list may trigger a content index of a search service to index the one or more recipients by referencing the expansion list so a discovery search may later be performed on the mailbox of the sender if and when the search is needed. The recipients may be indexed by a display name and/or one or more e-mail attributes associated with the recipients.

The operations included in process 700 are for illustration purposes. In-place preservation of one or more indirect recipients within the CMA may be implemented by similar processes with fewer or additional steps, as well as in different order of operations using the principles described herein.

The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

What is claimed is:

1. A method, executed at least in part by a computing device, to preserve a communication item within a communication management application (CMA), the method comprising:
   in response to a sender sending a communication item to one or more recipients using one or more distribution lists (DLs), flagging the communication item with an extended event flag;
   storing the flagged communication item as an extended event at an assistant service;
   expanding the one or more DLs of the communication item to retrieve an expansion list comprising the one or more recipients;
   filtering through a multitude of events by the assistant service to isolate the extended event prior to expansion;
   saving the expansion list to the communication item within the CMA, wherein the expansion list is preserved at the communication item in an in-place storage system of the CMA during a delivery time of the communication item;
   in response to the saving of the expansion list to the communication item, triggering a content index of a search service to index the one or more recipients in the expansion list within a mailbox of the sender of the communication item; and
   allowing a discovery search using one or more of a display name and one or more email address attributes associated with a recipient to be performed on the mailbox of the sender to determine communication items received by the recipient.

2. The method of claim 1, wherein expanding the one or more DLs of the communication item comprises:
   querying a directory server associated with the CMA to retrieve the expansion list comprising the one or more recipients.

3. The method of claim 2, wherein the one or more DLs are expanded during submission time of the communication item.

4. The method of claim 1, further comprising:
   saving the expansion list to the communication item within a mailbox of the sender.

5. The method of claim 4, further comprising:
   updating one or more properties of the communication item within the mailbox of the sender to save the expansion list to the communication item.

6. The method of claim 5, wherein updating the one or more properties includes updating the one or more properties with a display name and one or more email address attributes associated with the one or more recipients of the communication item.

7. The method of claim 1, further comprising:
   causing the one or more recipients to be indexed by a display name and one or more email address attributes associated with each of the one or more recipients of the communication item.

8. The method of claim 1, wherein the communication item is sent by the sender to the one or more recipients using the one or more DLs via one of: a TO, a carbon copy (CC), and a blind carbon copy (BCC) feature of the communication item.

9. A computing device to preserve a communication within a communication management application (CMA), the computing device comprising:
   a memory storing instructions;
   a processor coupled to the memory, the processor executing the CMA in conjunction with the instructions stored in the memory, the CMA configured to:
      flag a communication item with an extended event flag in response to a sender sending the communication item to one or more recipients using one or more distribution lists (DLs);
      store the flagged communication item as an extended event at an assistant service, wherein the assistant service filters through a multitude of events within the assistant service to isolate the extended event for expansion;

expand the one or more DLs of the communication item by querying a directory server associated with the CMA to retrieve an expansion list comprising the one or more recipients;

save the expansion list to the communication item within a mailbox of the sender within the CMA, wherein the expansion list is preserved at the communication item in an in-place storage system of the CMA during a delivery time of the communication item;

in response to the saving of the expansion list to the communication item, trigger a content index of a search service to index the one or more recipients in the expansion list within a mailbox of the sender of the communication item; and allow a discovery search using one or more of a display name and one or more email address attributes associated with a recipient to be performed on the mailbox of the sender to determine communication items received by the recipient.

10. The computing device of claim 9, wherein the one or more DLs include at least one or more distribution groups, mail-enabled security groups, and dynamic distribution groups.

11. The computing device of claim 9, wherein the one or more DLs include at least one of internal recipients and external recipients.

12. The computing device of claim 9, wherein the mailbox of the sender is on hold prior to the sending of the communication item.

13. The computing device of claim 9, wherein the communication item is flagged with the extended event flag if the communication item has a property indicating a need for group expansion.

14. The computing device of claim 9, wherein the directory server is configured to manage a database including one or more of contact information, permission information, and presence information associated with one or more subscribers of the CMA.

15. A computer-readable memory device excluding signals with instructions stored thereon to preserve a communication within a communication management application (CMA), the instructions comprising:

in response to a sender sending a communication item to one or more recipients using one or more distribution groups (DLs), flagging the communication item with an extended event flag;

storing the flagged communication item as an extended event at an assistant service, wherein a multitude of events are filtered within the assistant service to isolate the extended event for expansion;

expanding the one or more DLs of the communication item by querying a directory server associated with the CMA to retrieve an expansion list comprising the one or more recipients;

saving the expansion list to the communication item within the CMA by updating one or more properties of the communication item according to the expansion list within the CMA, wherein the expansion list is preserved at the communication item in an in-place storage system of the CMA during a delivery time of the communication item;

in response to the saving of the expansion list to the communication item, triggering a content index of a search service to index the one or more recipients in the expansion list within a mailbox of the sender of the communication item; and enabling a discovery search using one or more of a display name and one or more email address attributes associated with a recipient to be performed on the mailbox of the sender to determine communication items received by the recipient.

16. The computer-readable memory device of claim 15, wherein a property of the communication item associated with group expansion recipients is configured to save the expansion list to the communication item, the expansion list comprising the one or more recipients via TO, carbon copy (CC), and blind carbon copy (BCC) features of the communication item.

17. The computer-readable memory device of claim 15, wherein a property associated with group expansion error and a partial expansion list are saved to the communication item in response to an error in DL expansion.

* * * * *